United States Patent Office 3,338,964
Patented Aug. 29, 1967

3,338,964
TETRAKISDIFLUORAMINOCYCLOOCTADIENE
William D. Stephens, Huntsville, Ala., assignor to Thiokol Chemical Corporation, Bristol, Pa., a corporation of Delaware
No Drawing. Filed June 21, 1962, Ser. No. 206,541
1 Claim. (Cl. 260—563)

This invention relates to a new compound, tetrakisdifluoraminocyclooctadiene.

It has long been recognized that reactions between electronegative elements and those that are strongly electropositive can yield large amounts of energy. One of the most attractive combinations, from an energy viewpoint, is hydrogen and fluorine. A barrier to the practical utilization of the energy of the hydrogen-fluorine reaction has been the difficulty in incorporating these elements into a single molecule which is stable enough to be used safely and yet energetic enough to be useful.

Recent investigations have led to a method of synthesizing molecules containing both hydrogen and fluorine, but with the fluorine isolated from the hydrogen. Difluoramino radicals, consisting of two fluorine atoms attached to a nitrogen atom, can be added at the double bonds of unsaturated hydrocarbons to produce compounds containing hydrogen and fluorine attached to adjacent atoms.

A ready source of difluoramino radicals is tetrafluorohydrazine, an analog of hydrazine in which fluorine has replaced hydrogen. Under properly controlled conditions, tetrafluorohydrazine will split, yielding two difluoramino radicals. These radicals will then add across the double bond of an unsaturated hydrocarbon. In the simplest example of this reaction, one molecule of tetrafluorohydrazine would split to form two difluoramino radicals. The difluoramino radicals would then add across the double bond of ethene to form bisdifluoramino ethane.

A molecule such as difluoramino ethane would be too unstable, both chemically and physically, to be of practical use. A more desirable compound would be one with a higher molecular weight, preferably a liquid of high density and low volatility (high boiling point), and one in which the hydrogen and fluorine are stoichiometrically balanced. Higher density than that of an analogous linear compound can be obtained by difluoramino addition to a cyclic unsaturate. If the cyclic hydrocarbon is highly unsaturated, enough difluoramino groups can be incorporated into the molecule to obtain stoichiometric balance of the hydrogen and fluorine.

Cyclooctatetraene, an eight carbon ring alkene with four double bonds, meets the tentative requirements for a cyclic unsaturate set forth above. Addition of four difluoramino radicals to cyclooctatetraene produces tetrakisdifluoraminocyclooctadiene: $C_8H_8N_8F_8$. The compound is a dense, oily, yellow liquid of low volatility (B.P. 82° C. at 0.2 mm.) which is balanced with respect to hydrogen and fluorine. The compound is less shock sensitive than nitroglycerine, by a factor of two, and can be employed in the same manner as nitroglycerine, for example, admixed with an inert filler as in dynamite.

The equipment used in the following exemplary syntheses is basically the same as is used in a number of hazardous reactions. The reaction vessel is of the "rocking bomb" type, jacketed for temperature control. It is fitted with manifolding so that it may be evacuated, flushed with purging gas, charged with tetrafluorohydrazine, isolated during reaction, and vented of unreacted gases. The manifolding is set up so that these operations can be carried out remotely. Remote temperature and pressure monitoring instruments are also fitted.

Example 1

Cyclooctatetraene (5.00 grams, 0.05 mole) is dissolved in 100 milliliters of chlorobenzene and the solution is placed in the reactor. Air is removed from the system by repeated evacuation and purging with argon. Tetrafluorohydrazine (10 grams, 0.1 mole) is charged to the reactor to a pressure of 40 p.s.i.g. and the reactor is isolated from the remainder of the system.

The reactor is heated to 91–96° C. and agitated for six hours, after which it is permitted to cool to room temperature overnight. Unreacted tetrafluorohydrazine is removed by bleeding it to atmosphere, followed by repeatedly evacuating and purging the reactor with argon.

The liquid reaction mixture resulting from the preceding steps is removed from the reactor, and the chlorobenzene solvent is removed under vacuum, leaving the crude product and unreacted starting material. The purified tetrakisdifluoraminocyclooctadiene product is recovered by distillation at 83–85° C. at 1 mm. pressure.

Example 2

As in Example 1, cyclooctatetraene (4.00 grams, 0.058 mole) dissolved in chlorobenzene is prepared for reaction. The reactor is then charged with tetrafluorohydrazine (24.4 grams, 0.235 mole) at 75 p.s.i.g. The reaction mixture is heated to 90° C. and agitated for 30 hours and is then cooled to 25° C. Unreacted gases are bled off and the system purged as in Example 1.

The resulting liquid reaction mixture is removed from the reactor and concentrated under vacuum to give 12.38 grams of crude tetra-adduct. The purified tetrakisdifluoraminocyclooctadiene is recovered by distillation at 42–43° C. at 0.01 mm. pressure.

Analysis of the purified product gave the following results: $C_8H_8N_8F_8$, calculated: C, 30.78; H, 2.58; N, 17.95. Found: C, 31.30; H, 2.83; N, 18.13.

What is claimed is:
Tetrakisdifluoraminocyclooctadiene.

References Cited
UNITED STATES PATENTS
3,215,709   11/1965   Logothetis _____ 260—349

CHARLES B. PARKER, Primary Examiner.

O. R. VERTIZ, Examiner.

B. BILLIAN, J. W. WHISLER, Assistant Examiners.